Figure 1:
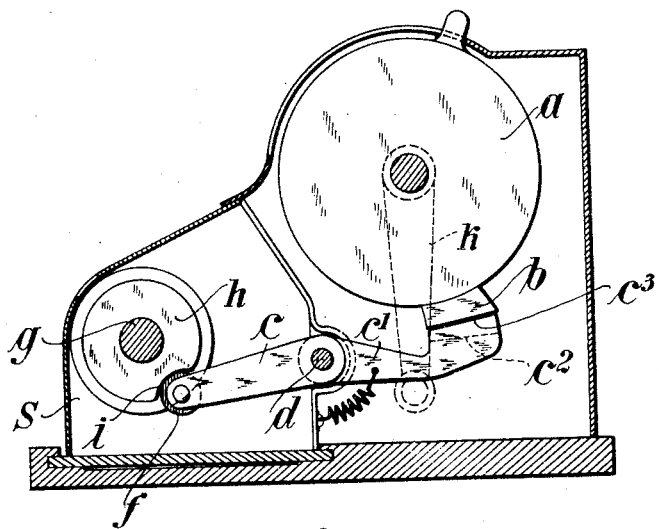

V. J. ODHNER.
LOCKING DEVICE FOR CALCULATING MACHINES.
APPLICATION FILED JULY 27, 1911.

1,010,067.

Patented Nov. 28, 1911.

2 SHEETS—SHEET 1.

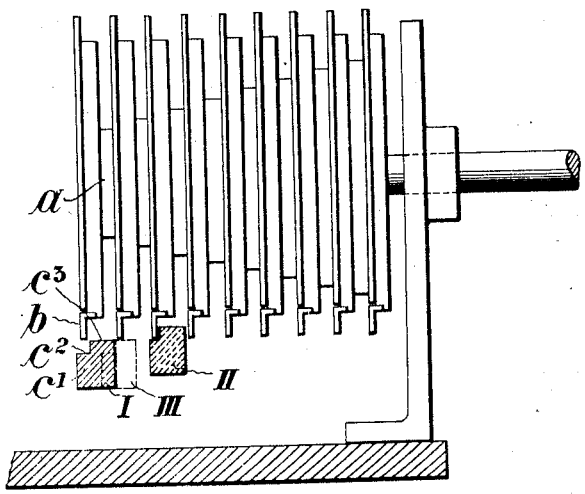
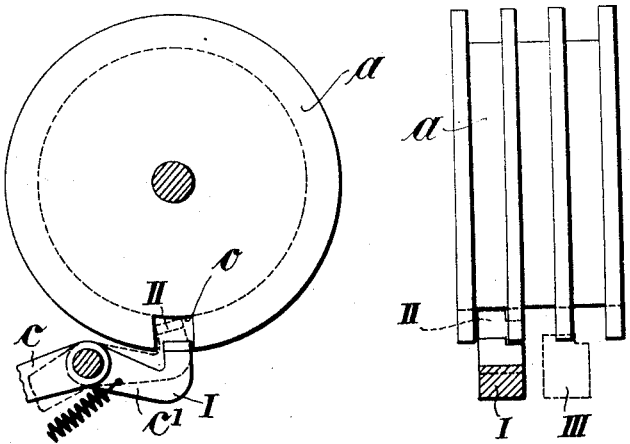

UNITED STATES PATENT OFFICE.

VALENTIN JAKOB ODHNER, OF ST. PETERSBURG, RUSSIA.

LOCKING DEVICE FOR CALCULATING-MACHINES.

1,010,067.   Specification of Letters Patent.   Patented Nov. 28, 1911.

Application filed July 27, 1911.   Serial No. 640,901.

*To all whom it may concern:*

Be it known that I, VALENTIN JAKOB ODHNER, a subject of the King of Sweden, and residing at St. Petersburg, Russia, have invented certain new and useful Improvements in Locking Devices for Calculating-Machines, of which the following is a specification.

My invention relates to locking devices for the disk-drums of calculating machines.

As calculating machines may be injured when the crank-handle of the adjusting mechanism is rotated while the axle for replacing the disks to zero, hereinafter briefly called the zero axle, is not in its correct position, and reversely, various locking devices have heretofore been arranged between these two parts. For example, locking devices have been proposed comprising one disk mounted on the crank-shaft and one on the zero axle, which disks are so shaped that their peripheries overlap one another and the one can engage in a recess in the other. Further, locking devices have been used, in which a locking lever is connected between two disks arranged on the shafts to be locked, which lever is rocked by the one disk, when it rotates, into a recess in the other in order to lock the latter.

Various defects are attached to the known locking devices of which only the following will be mentioned:—Some of the devices are inoperative as soon as the locking members pass out of their plane of oscillation which must occur when while using the calculating machine the counting mechanism carriage and the zero axle journaled therein are shifted. The carriage therefore had always first to be returned into its initial position, when it was wished to rotate the zero axle, in order that the crank-handle might be locked for the time being. Also, the problem in question cannot be satisfactorily solved by arranging an arm on locking devices provided with a revoluble locking lever arranged between the parts to be locked, said arm being accessible from without and elastically journaled in such manner in the carriage that it constantly tends to project into the path of the locking lever and is retained in its normal position only in the normal position of the carriage by abutting against a fixed part of the machine; in such locking devices, whenever the counting mechanism carriage is shifted and the zero axle is to be rotated, the said arm must be tilted over, and, in addition, the crank-handle is locked only in the initial position of the counting mechanism carriage when the zero axle is in an incorrect position, whereas a locking action in this sense is at once done away with as soon as the counting mechanism carriage is shifted.

Now a primary object of my invention is to provide a locking device between the crank-shaft and zero axle which likewise, similarly to the well-known locking devices, comprises a lever fulcrumed between the adjusting mechanism and the counting mechanism, but which is so constructed that it not only locks the crank-handle in every position of the counting mechanism carriage when the zero axle is not correctly positioned, or locks the zero axle when the crank-handle is not in its correct position, but also locks both the zero axle and the crank-shaft when the counting mechanism carriage is not correctly positioned, and prevents the carriage being shifted when the zero axle or the crank-shaft is rotated. I attain this end by providing the locking lever with various abutment faces or stops which operate when the one or the other part to be locked is in an incorrect position.

Two illustrative embodiments of my invention are represented by way of example in the accompanying drawings, wherein:—

Figure 2:
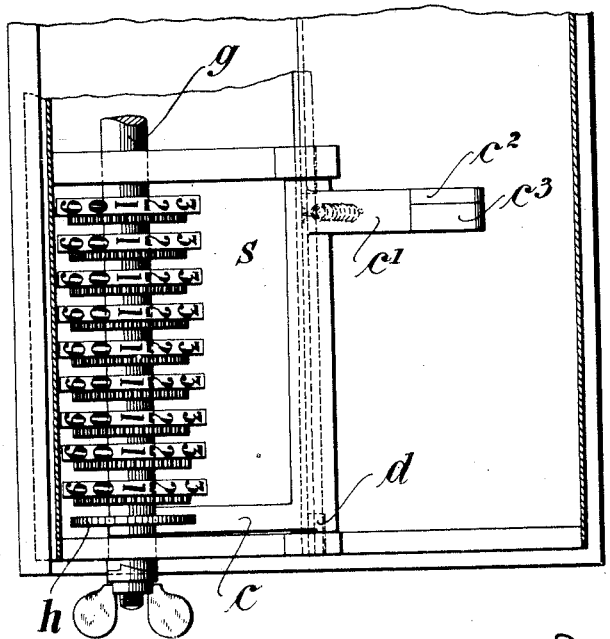

Figure 1 is a transverse sectional elevation, Fig. 2 a top plan view, after some parts have been removed, and Fig. 3 a front elevation, partly in section, showing one form, and Fig. 4 is an end sectional elevation, and Fig. 5 a front elevation, partly in section, showing the second form.

Referring firstly to Figs. 1 to 3, as many disks $a$ are arranged at equal distances from one another on the drum or crank-shaft of the calculating machine as there are places to which the mechanism carriage $s$ can be shifted. Each of these disks $a$ is provided on its periphery with a projection or lug $b$. A two-armed lever $c$, $c^1$ which is fulcrumed at $d$ on the carriage $s$ and preferably has the shape shown in Fig. 2 can coact with this projection. The free end of the arm $c$ carrying an antifriction roller $f$ abuts against a cam $h$ which is fast on the zero axle $g$ and has a recess $i$, while the other arm $c^1$ projects under the adjusting mechanism.

The transverse portion of the lever connecting the two arms $c$, $c^1$ is so long that the arm $c^1$ can meet with one of the adjusting disks in every position of the counting mechanism carriage and, if necessary, can lock the same. This arm $c^1$ projecting under the disks $a$ has the sectional form shown in Fig. 3, i. e. it is provided with two abutment faces $c^2$ and $c^3$ arranged in the form of steps relatively to one another.

The above described device operates as follows:—When the crank-handle $k$, the carriage $s$ and the axle $g$ are all in their correct positions, the locking members occupy the position indicated in Fig. 1 corresponding with that designated I in Fig. 3, so that no part is locked and the machine is not prevented from being used. If, on the contrary, the axle $g$ rotatable by the winged nut $m$ is not in its correct position, for example, the lever $c, c^1$ being rotated by the cam $h$ fast on the axle $g$, so that its projection $c^2$ will rest against the projection $b$ of one of the disks $a$ and prevent the latter rotating and with it the crank-handle $k$, and also prevents the carriage $s$ being shifted. This position of the lever, $c, c^1$ is designated II in Fig. 3. If, on the other hand, the counting mechanism carriage is so shifted that its bolt does not snap into one of the slots in the base while the axle $g$ and the crank-handle $k$ occupy their proper positions, the roller $f$ of the lever $c, c^1$ will lie in the recess $i$ of the cam $h$ and the lever will consequently be positioned so that its upper abutment face $c^3$ abuts under the projection $b$ of one of the disks $a$, and consequently likewise prevents the rotation of the disks $a$ and of the crank-handle but simultaneously also makes it impossible for the axle $g$ to rotate. This position is designated III in Fig. 3.

Referring now to Figs. 4 and 5, the disks $a$ are locked by the lever arm $c^1$ engaging in a recess $o$ provided in the disks $a$. When the counting mechanism carriage, the zero axle and the crank-shaft are in their rest positions, the lever $c, c^1$ is in the position I indicated in full lines in Figs. 4 and 5, so that all the parts of the machine can freely move. When the zero axle is rotated while the counting mechanism carriage is in its correct position, the locking lever is in the position II and prevents the rotation of the adjusting mechanism and simultaneously prevents the counting mechanism carriage being shifted when the zero axle has been rotated. If, lastly, the counting mechanism carriage is incorrectly positioned, while the zero axle and the adjusting mechanism are in their normal positions, the locking lever occupies position III in Fig. 5. In this form also, the same parts of the machine form a lock which simultaneously prevents the crank-handle being rotated in the incorrect position of the counting mechanism carriage or of the zero axle, the carriage being shifted when the zero axle is in an incorrect position, and the zero axle being rotated when the carriage is in an incorrect position; in addition, however, in this form the zero axle and the carriage are locked when the crank-handle is rotated because the locking lever $c, c^1$ cannot then rock.

I claim:—

1. In a calculating machine, the combination, with the frame, a crank-shaft journaled therein, disks fast on the crank-shaft, a counting mechanism carriage slidable in the frame, and an axle journaled in the carriage, of a cam fast on the axle, and a two-armed lever fulcrumed on the carriage, one arm of the lever being adapted to coact with the said cam and the other arm having two step-like abutment faces, one of the faces being adapted to coact with said disks and lock the same when the said axle is in an incorrect position and the other face being adapted to coact with the said disks and lock the same when the said carriage is in an incorrect position.

2. In a calculating machine, the combination, with the frame, a crank-shaft journaled therein, disks fast on the crank-shaft, each disk having a lug, a counting mechanism carriage slidable in the frame, and an axle journaled in the carriage, of a cam fast on the axle, and a two-armed lever fulcrumed on the carriage, one arm of the lever being adapted to coact with the said cam and the other arm having two step-like abutment faces, one of the faces being adapted to coact with a lug and lock the said disks when the said axle is in an incorrect position and the other face being adapted to coact with a lug and lock the said disks when the said carriage is in an incorrect position.

In testimony whereof, I affix my signature in the presence of two witnesses.

VALENTIN JAKOB ODHNER.

Witnesses:
L. HOLTZHAUER,
H. A. LOVIAGUINE.